United States Patent [19]

Chattin

[11] 4,427,946

[45] Jan. 24, 1984

[54] MOBILE IONIZATION CHAMBER WITH PORTABLE POWER SUPPLY PACKAGED IN INSULATED HOUSING

[75] Inventor: Robert A. Chattin, Mundelein, Ill.

[73] Assignee: Advanced Instrument Development, Inc., Melrose Park, Ill.

[21] Appl. No.: 244,169

[22] Filed: Mar. 16, 1981

[51] Int. Cl.[3] ........................ G01T 1/175; H05G 1/26

[52] U.S. Cl. ........................................ 328/7; 250/374; 363/61; 307/296 R; 307/308; 378/97; 378/201

[58] Field of Search .................... 250/374; 307/296 R, 307/296 A, 308; 363/21, 61; 378/97, 201, 208

[56] References Cited

U.S. PATENT DOCUMENTS

| | | | |
|---|---|---|---|
| 4,053,774 | 10/1977 | Berdahl | 378/97 |
| 4,121,590 | 10/1978 | Gonser | 328/7 |
| 4,167,036 | 9/1979 | Kenney | 363/61 |
| 4,230,944 | 10/1980 | Wiegman et al. | 379/97 |
| 4,246,635 | 1/1981 | Arima | 363/61 |

*Primary Examiner*—John S. Heyman
*Attorney, Agent, or Firm*—Leo J. Aubel

[57] ABSTRACT

This invention relates to a mobile ionization chamber assembly for monitoring the amount of radiation delivered to an X-ray film from an X-ray source. The ionization chamber together with a portable power supply therefor are encased in an insulated housing for reducing electrical hazards to the patient and operator involved in the X-ray procedure.

5 Claims, 9 Drawing Figures

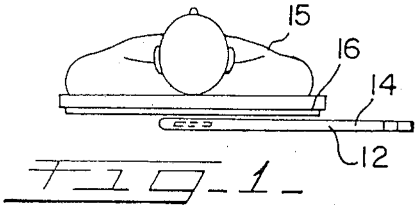
FIG. 1
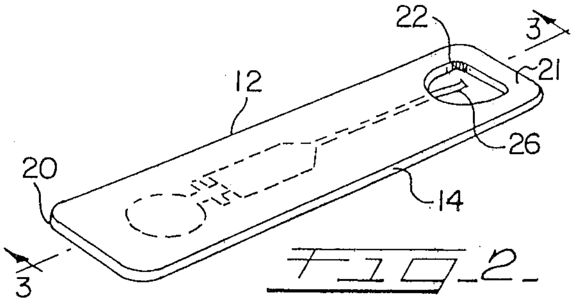
FIG. 2
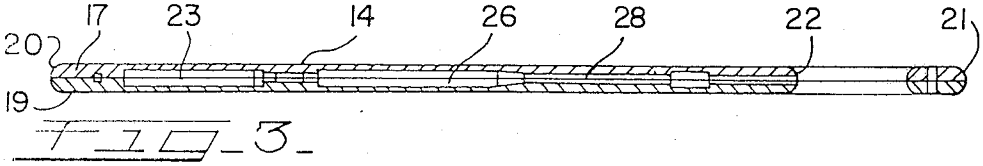
FIG. 3
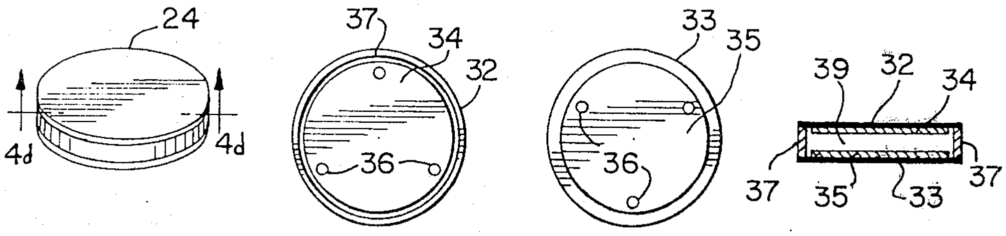
FIG. 4(a) (b) (c) (d)
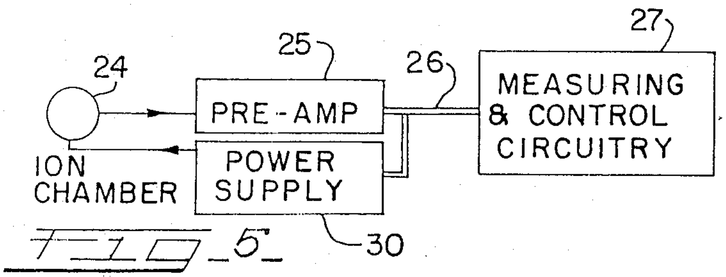
FIG. 5
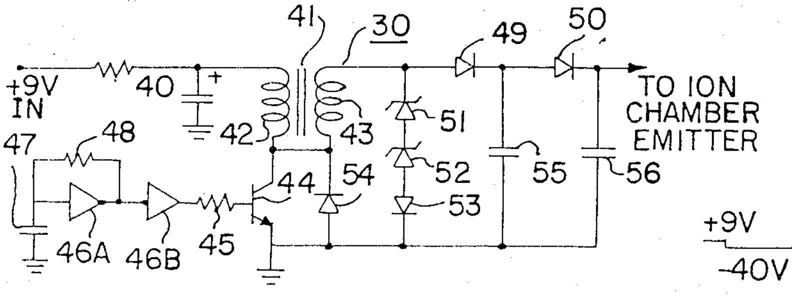
FIG. 6
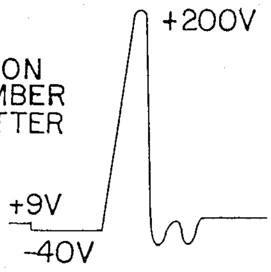
FIG. 7

MOBILE IONIZATION CHAMBER WITH PORTABLE POWER SUPPLY PACKAGED IN INSULATED HOUSING

DESCRIPTION

1. Technical Field

The present invention is related to U.S. Pat. Application Ser. No. 10,550 for X-Ray System Exposure Control with Ion Chamber, filed Feb. 9, 1979, in the names of Douglas C. Wiegman and James A. Grichnik, now U.S. Pat. No. 4,230,944, assigned to the same assignee as the present invention, and incorporated herein by reference.

2. Background Prior Art

U.S. Pat. No. 4,230,944, is directed to an X-ray system which includes an ionization chamber for monitoring the amount of radiation delivered to an X-ray film. In that application, the kVp (peak kilovoltage) and mA (milliamperes) settings of the system X-ray generator are monitored and correlated with the exposure time required to produce good quality images. More specifically, the ionization chamber in said U.S. Pat. No. 4,230,944 is electrically connected to the system X-ray generator to selectively terminate the output of the generator to achieve good quality images for varied kVp and mA settings of the generator.

SUMMARY OF THE INVENTION

The present invention is directed to a mobile ionization (ion) chamber assembly for monitoring the amount of radiation delivered to an X-ray film cassette from an X-ray source. An elongated housing contains and encloses the ion chamber to permit the ion chamber to be normally positioned beneath the patient and adjacent the X-ray film cassette. In one embodiment, the ion chamber comprises a cylindrical member including an emitter plate electrode, a collector plate electrode suitably separated from each other to form an ion space or chamber there between.

DESCRIPTION OF THE DRAWINGS

Objects and advantages in addition to those specifically set forth will become apparent from the reference to the accompanying drawings and following description wherein:

FIG. 1 is a pictorial representation of one embodiment of the invention as used with a patient;

FIG. 2 is an isometric view of the inventive mobile ion chamber assembly;

FIG. 3 is a cross-sectional view taken along the line 3—3 of FIG. 2;

FIG. 4*a* is an isometric view of the ion chamber; FIGS. 4*b* and 4*c* are respectively internal views of the upper or top, and lower or bottom members of the ion chamber; and FIG. 4*d* is a cross-sectional view of the ion chamber taken along lines 4*d*—4*d* of FIG. 4*a;*

FIG. 5 is a block diagram depicting the electronic circuitry of the invention;

FIG. 6 is a schematic diagram of the power supply circuitry of the invention; and FIG. 7 is a waveform useful in explaining the circuitry of FIG. 6.

DETAILED DESCRIPTION OF THE INVENTION

Refer first to FIG. 1 which schematically illustrates the positioning of the mobile ionization (ion) chamber assembly 12 of the invention in a typical application. As shown, the ion chamber assembly 12 including housing 14, is positioned beneath the patient 15 and the X-ray film cassette 16 to thus monitor the radiation passing through the patient to the X-ray film.

FIG. 2 shows one embodiment of the ion chamber assembly 12 wherein the assembly housing or paddle 14 is approximately 24" in length, 6" in width and 0.6" in height. (It should be understood at the outset that the various dimensions are illustrative and not necessarily limiting.) Referring also to FIG. 3, the housing 14 is constructed of two essentially identical pieces 17 and 19 of suitable non-conductive material such as plastic which are positioned in abutting face-to-face relation. The ends 20 and 21 of the housing 14 are tapered to facilitate insertion of the paddle under the film cassette 16 and for handling.

The handle end 21 of the housing 14 has a 3"×4" half moon shaped aperture 22 to permit the operator to easily grasp the housing 14 for positioning the unit as desired. The housing 14 also includes a recess 23 for receiving the ion chamber module 24, and a recess 26 for receiving pre-amplification circuitry 25 and a power supply 30, (see FIG. 5) as will be explained.

Referring to FIGS. 4*a*–4*d,* the ion chamber module 24 is of cylindrically configuration, approximately 3.25" in diameter and ⅜" in height, and is positioned and embedded approximately 2.25" from the tapered end 20 of the housing 14 in recess 23. As indicated in FIG. 5, the ion chamber 24 is electrically connected to a pre-amplification (pre-amp) circuit 25 which is positioned and embedded in a second recess 26 formed in housing 14. An electrical cable 26 extends from pre-amp circuit 25 and is positioned in an elongated recess 28 formed in housing 14, which recess extends to aperture 22 in the handle end 21 of the housing 14. Cable 26 is coupled to the electronic measuring and control circuitry 27 of the associated X-ray system, as indicated in FIG. 5.

As is known, in operation, the ion chamber 24 senses the amount of X-ray radiation, and converts the sensed radiation into an electrical signal which is amplified by the pre-amplification circuit 25 in housing 14 and the signal is coupled through cable 26 to the electronic circuitry 27 for processing as described, for example, in the above-mentioned U.S. Pat. No. 4,230,944.

Refer now also to FIG. 4. The upper and lower plates 32 and 33 respectively of the ion chamber module 24 are formed of a thin layer material such as Mylar ® plastic or Plexiglas ®. Thin, approximate 1/64", circular plates of lead and plastic 34 and 35 are suitably affixed as by eye-let 36 to the Mylar. A brass ring 37 is affixed between the Mylar plates 32 and 33 in spaced relation to the lead plates 34 and 35 to provide a spacing between the lead plates which spacing forms the ion chamber 39 per se. Plate 34 has a high voltage source connected thereto, as will be explained, to provide an emitter electrode. Plate 35 is connected to a reference potential to provide a collector electrode.

FIG. 6 is a schematic diagram of the power supply 30 for the ion chamber. An important feature of the inventive ion chamber assembly 12 is that it is an electrically safe unit. There is no external high voltage coupling to the assembly 12. In prior art devices a high level, approximately +200 to +300 volts, power supply is coupled to the ion chamber from an external source. In contrast in the present invention a low, non-lethal, +9 volt source is coupled through cable 26 to the power supply 30 which is completely enclosed, and sealed in housing 14. The +9 V source is coupled through an RC circuit 40 to one terminal of the primary winding 42 of a transformer 41; the other terminal of winding 42 is coupled to the collector of an NPN transistor 44. Transistor 44 has its emitter connected to ground reference. A capacitor 47 has one terminal connected to ground and its other terminal connected through inverter amplifiers 46A and 46B, and resistor 45 to the base of transistor 44. A resistor 48 is connected across amplifier 46A. The purpose of the foregoing circuit is to provide a square wave signal of sufficient power to drive transistor 44.

The secondary winding 43 of transformer 41 has its upper terminal connected in series through diodes 49 and 50 to the emitter plate 32 of the ion chamber module 24. Filter capacitors 55 and 56 are connected from the junction of diodes 49 and 50 to ground.

The upper terminal of winding 43 is also connected in series to the cathode of Zener diode 51 which has its anode connected to the cathode of Zener diode 52, and which in turn has its anode connected to the anode of diode 53 and to ground. Diode 54 has its cathode connected to the lower terminal of winding 43 and its anode connected to ground reference. The lower terminals of windings 42 and 43 are electrically connected, as is known. The Zener diodes 51 and 52 limit the amplitude of the output voltage to the desired voltage.

FIG. 6 operates to amplify the +9 V input and provide an output voltage of about +200 V. In operation transistor 44 conducts until capacitor 47 charges to cause transistor 44 to turn off, when transistor 44 turns off, a positive voltage will be generated across windings 42 and 43 and coupled across capacitor 55 and 56, see FIG. 7. The voltage across capacitors 55 and 56 is limited by Zener diodes 51 and 52 to about +200 volts. Thus the high voltage for the emitter electrode 32 is generated entirely within the housing 14, shielded from the patient, and, from the operator.

While the invention has been particularly shown and described with reference to a preferred embodiment thereof, it will be understood by those skilled in the art, that various changes in form and details may be made therein without departing from the spirit and scope of the invention.

I claim:

1. A portable ionization chamber assembly for monitoring X-rays provided to a film cassette positioned adjacent a patient, comprising in combination a housing member of nonconductive material, said housing having an enclosed recess means, an ionization chamber operable at a relatively high voltage mounted in said recess means, voltage amplification circuitry mounted in said recess means, means for coupling an electrical potential of relatively low voltage to said housing and to said voltage amplification circuitry, said voltage amplification circuitry providing a high voltage to energize said ionization chamber and said voltage amplification circuitry and said ion chamber being entirely enclosed within said housing whereby the patient and the operator are insulated from any high voltage necessary for ion chamber operation and hence are not subject to electrical voltage hazards therefrom.

2. A mobile ionization chamber assembly as in claim 1 wherein the ion chamber is formed of a pair of spaced conductive plates with one plate having a high voltage applied thereto and wherein the other plate is coupled to provide an output signal dependent on the energization of said ion chamber by the X-rays.

3. A mobile ionization chamber assembly as in claim 2 further including electronic circuitry connectable to a relatively low voltage, transformer means having primary and secondary windings for amplifying said low voltage to provide a high voltage low current output, and means for connecting said high voltage to said one plate of said ion chamber.

4. Appparatus as in claim 3 wherein said electronic circuitry includes means for receiving approximately +9 Volt input to one terminal of the primary winding of said transformer, a transistor having a base, emitter and collector electrode and having its emitter to collector electrodes connected in the current path of said primary winding, said base being connected to a circuit having capacitor storage means arranged to charge and discharge to thereby cause said transistor to turn on and off, and capacitor and diode means connected across the secondary winding to provide a D.C. output.

5. Apparatus as in claim 4 further including Zener diodes connected across the secondary winding to limit the amplitude of the output voltage.

* * * * *